US012774085B2

(12) United States Patent
McCaffrey

(10) Patent No.: US 12,774,085 B2
(45) Date of Patent: Oct. 27, 2026

(54) PROPULSOR ROTOR ARRANGEMENT FOR OPEN ROTOR PROPULSION SYSTEM

(71) Applicant: RTX Corporation, Farmington, CT (US)

(72) Inventor: Michael G. McCaffrey, Windsor, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/003,524

(22) Filed: Dec. 27, 2024

(65) Prior Publication Data

US 2026/0184421 A1 Jul. 2, 2026

(51) Int. Cl.

| | |
|---|---|
| ***B64C 11/18*** | (2006.01) |
| ***B64D 27/10*** | (2006.01) |
| ***F01D 5/14*** | (2006.01) |
| ***F02K 3/02*** | (2006.01) |
| *B64D 33/02* | (2006.01) |

(52) U.S. Cl.

CPC .............. *B64C 11/18* (2013.01); *B64D 27/10* (2013.01); *F01D 5/147* (2013.01); *F02K 3/025* (2013.01); *B64D 2033/0293* (2013.01)

(58) Field of Classification Search

CPC ......... B64C 11/18; B64C 11/48; F01D 5/147; F02K 3/072; F02K 3/077; F05D 2220/324; F05D 2220/325

See application file for complete search history.

(56) References Cited

U.S. PATENT DOCUMENTS

| | | | | |
|---|---|---|---|---|
| 9,714,575 B2 | 7/2017 | Henze | | |
| 10,494,086 B2 | 12/2019 | Vion | | |
| 2013/0156583 A1* | 6/2013 | Wood | F01D 5/20 | 416/198 A |
| 2015/0147181 A1* | 5/2015 | Henze | B64C 11/18 | 416/215 |
| 2017/0369153 A1* | 12/2017 | Vion | F01D 7/00 | |
| 2024/0044253 A1* | 2/2024 | Kray | F02K 3/06 | |
| 2025/0326484 A1 | 10/2025 | Gea Aguilera | | |

FOREIGN PATENT DOCUMENTS

| | | |
|---|---|---|
| WO | 2023110701 A1 | 6/2023 |
| WO | 2024094948 A1 | 5/2024 |

OTHER PUBLICATIONS

EP Search Report for EP Patent Application No. 25226999.8 dated May 11, 2026.

* cited by examiner

*Primary Examiner* — Scott J Walthour
(74) *Attorney, Agent, or Firm* — Getz Balich LLC

(57) ABSTRACT

An assembly is provided for an aircraft propulsion system. This assembly includes an open propulsor rotor and an open guide vane structure. The open propulsor rotor is configured to rotate about an axis. The open propulsor rotor includes a plurality of open propulsor blades arranged circumferentially about the axis in a blade array. Each of the open propulsor blades projects spanwise into an environment external to the aircraft propulsion system to a respective blade tip. The open propulsor blades include a first span propulsor blade and a second span propulsor blade. The first span propulsor blade has a first span length. The second span propulsor blade has a second span length that is less than the first span length. The open guide vane structure is axially next to the open propulsor rotor.

18 Claims, 12 Drawing Sheets

PROPULSOR ROTOR ARRANGEMENT FOR OPEN ROTOR PROPULSION SYSTEM

BACKGROUND OF THE DISCLOSURE

1. Technical Field

This disclosure relates generally to an aircraft and, more particularly, to a propulsion system for the aircraft.

2. Background Information

Various types and configurations of propulsion systems are known in the art for an aircraft, including open rotor propulsion systems. While these known propulsion systems have various benefits, there is still room in the art for improvement.

SUMMARY OF THE DISCLOSURE

According to an aspect of the present disclosure, an assembly is provided for an aircraft propulsion system. This assembly includes an open propulsor rotor and an open guide vane structure. The open propulsor rotor is configured to rotate about an axis. The open propulsor rotor includes a plurality of open propulsor blades arranged circumferentially about the axis in a blade array. Each of the open propulsor blades projects spanwise into an environment external to the aircraft propulsion system to a respective blade tip. The open propulsor blades include a first span propulsor blade and a second span propulsor blade. The first span propulsor blade has a first span length. The second span propulsor blade has a second span length that is less than the first span length. The open guide vane structure is axially next to the open propulsor rotor.

According to another aspect of the present disclosure, another assembly is provided for an aircraft propulsion system. This assembly includes an open propulsor rotor and an open guide vane structure. The open propulsor rotor is configured to rotate about an axis. The open propulsor rotor includes a plurality of open propulsor blades arranged circumferentially about the axis in an array. Each of the open propulsor blades projects spanwise into an environment external to the aircraft propulsion system to a respective blade tip. The open propulsor blades include a first propulsor blade and a second propulsor blade. The first propulsor blade has a first tip radius. The second propulsor blade has a second tip radius that is less than the first tip radius. The open guide vane structure is axially next to the open propulsor rotor.

According to still another aspect of the present disclosure, another assembly is provided for an aircraft propulsion system. This assembly includes an open propulsor rotor open propulsor rotor is configured to rotate about an axis. The open propulsor rotor includes a plurality of open propulsor blades arranged circumferentially about the axis in an array. Each of the open propulsor blades projects spanwise into an environment external to the aircraft propulsion system to a respective blade tip. The open propulsor blades include a first propulsor blade and a second propulsor blade. A configuration of a tip section of the first propulsor blade is different than a configuration of a tip section of the second propulsor blade. The tip section of the second propulsor blade is configured to generate a tip vortex that will destructively interact with a tip vortex generated by the tip section of the first propulsor blade.

The first propulsor blade may have a first tip radius. The second propulsor blade may have a second tip radius that is less than the first tip radius.

The second span length may be equal to or greater than eighty-five percent of the first span length.

The second span length may be equal to or less than ninety-eight percent of the first span length.

The second span propulsor blade may circumferentially neighbor the first span propulsor blade in the blade array about the axis.

A first center of gravity of the first span propulsor blade and a second center of gravity of the second span propulsor blade may be located at a common radial distance from the axis.

A first configuration of a tip section of the first span propulsor blade may be different than a second configuration of a tip section of the second span propulsor blade.

A first geometry of a tip section of the first span propulsor blade may be different than a second geometry of a tip section of the second span propulsor blade when viewed in a reference plane parallel with the axis.

A first geometry of a tip section of the first span propulsor blade may be different than a second geometry of a tip section of the second span propulsor blade when viewed in a reference plane perpendicular to the axis.

A first camber of a tip section of the first span propulsor blade may be different than a second camber of a tip section of the second span propulsor blade when viewed in a reference plane perpendicular to the axis.

A first pitch of a tip section of the first span propulsor blade may be different than a second pitch of a tip section of the second span propulsor blade when viewed in a reference plane perpendicular to the axis.

The first span propulsor blade may be one of a plurality of first span propulsor blades included in the open propulsor blades. The second span propulsor blade may be one of a plurality of second span propulsor blades included in the open propulsor blades. The second span propulsor blades may be circumferentially interposed with the first span propulsor blades.

The open guide vane structure may include a plurality of open guide vanes arranged circumferentially about the axis in a vane array. Each of the open guide vanes may project spanwise into the environment external to the aircraft propulsion system to a respective vane tip. A tip radius of a first of the open guide vanes may be less than a tip radius of the second span propulsor blade.

The open guide vane structure may include a plurality of open guide vanes arranged circumferentially about the axis in a vane array. Each of the open guide vanes may project spanwise into the environment external to the aircraft propulsion system to a respective vane tip. A tip radius of a first of the open guide vanes may be equal to a tip radius of the second span propulsor blade.

The open guide vane structure may include a plurality of open guide vanes arranged circumferentially about the axis in a vane array. Each of the open guide vanes may project spanwise into the environment external to the aircraft propulsion system to a respective vane tip. A tip radius of a first of the open guide vanes may be greater than a tip radius of the second span propulsor blade.

The open guide vane structure may be disposed downstream of the open propulsor rotor.

The assembly may also include a turbine engine configured to drive rotation of the open propulsor rotor about the axis. The turbine engine may include a flowpath, a compressor section, a combustor section and a turbine section.

The flowpath may extend through the compressor section, the combustor section and the turbine section from an inlet into the flowpath to an exhaust from the flowpath.

The open propulsor rotor may be arranged axially forward of the turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
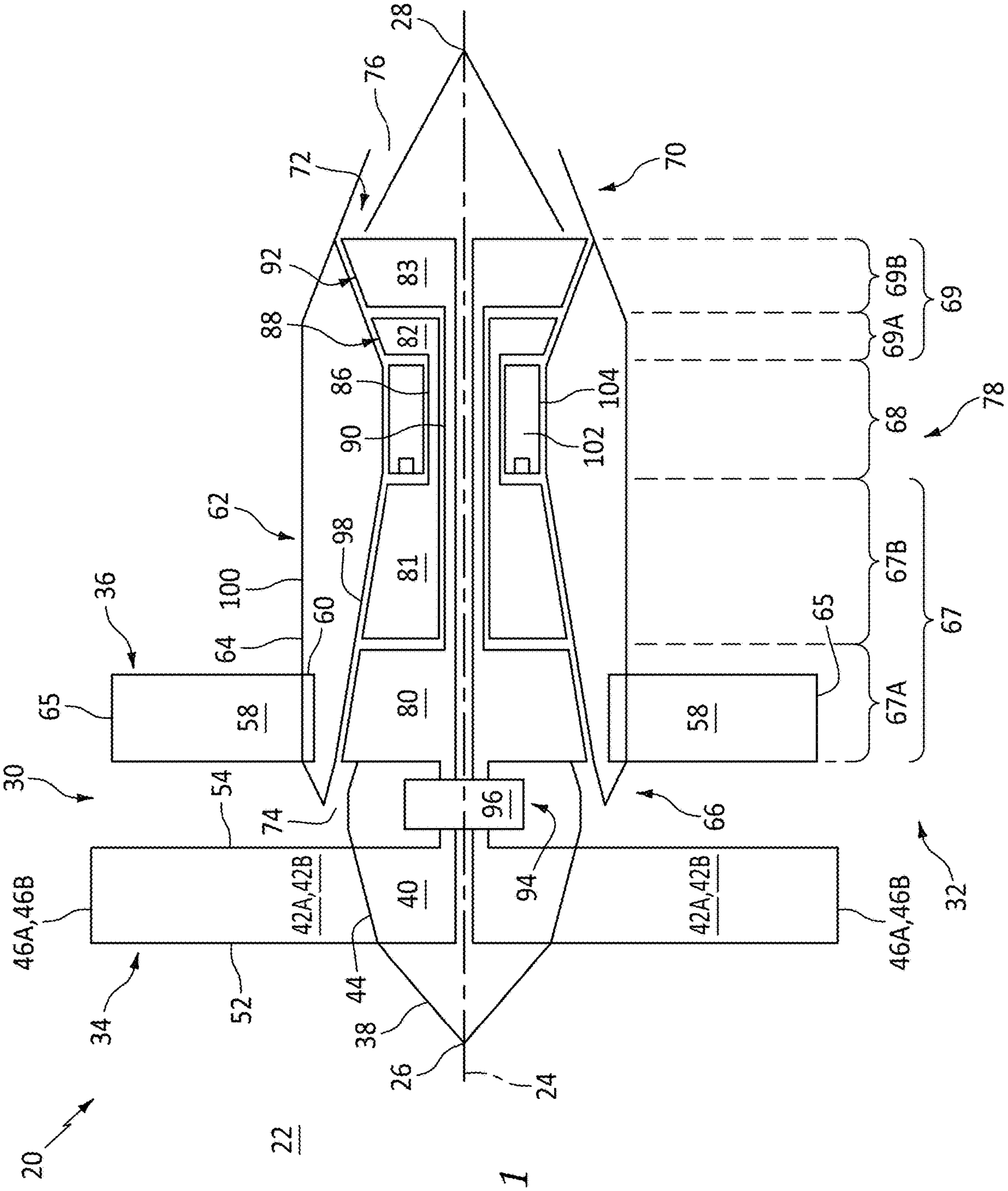
FIG. 1 is a schematic sectional illustration of an aircraft propulsion system.

FIG. 1 is a schematic illustration of a propulsion system 20 for an aircraft. The aircraft may be an airplane, a drone (e.g., an unmanned aerial vehicle (UAV)), or any other manned or unmanned aerial vehicle or system. The aircraft propulsion system 20 may be configured as an open rotor propulsion system with a single open rotor and swirl recovery vane (SRV) architecture. Herein, the term "open" may describe a propulsion system section and/or a propulsion system component which is open to an environment 22 (e.g., an ambient environment) external to the aircraft propulsion system 20 and, more generally, the aircraft.

The aircraft propulsion system 20 extends axially along an axis 24 between an upstream, forward end 26 of the aircraft propulsion system 20 and a downstream, aft end 28 of the aircraft propulsion system 20. The propulsion system axis 24 may be a centerline axis of the aircraft propulsion system 20 and/or a centerline axis of one or more members of the aircraft propulsion system 20. The propulsion system axis 24 may also or alternatively be a rotational axis of one or more members of the aircraft propulsion system 20. The aircraft propulsion system 20 of FIG. 1 includes an open rotor propulsion section 30 (e.g., an open rotor propulsion module) and a gas turbine engine 32.

The propulsion section 30 of FIG. 1 includes an open propulsor rotor 34 and an open guide vane structure 36. These propulsion section members 34 and 36 are un-ducted and (optionally) unshrouded components of the aircraft propulsion system 20 and its propulsion section 30. The propulsion section 30 of FIG. 1 also includes a nose cone 38 disposed at (e.g., on, adjacent or proximate) the propulsion system forward end 26. Briefly, this nose cone 38 may be configured as a spinner which is rotatable with the propulsor rotor 34 about the propulsion system axis 24. Alternatively, the nose cone 38 may be configured as a stationary structure of the propulsion section 30.

Figure 2:
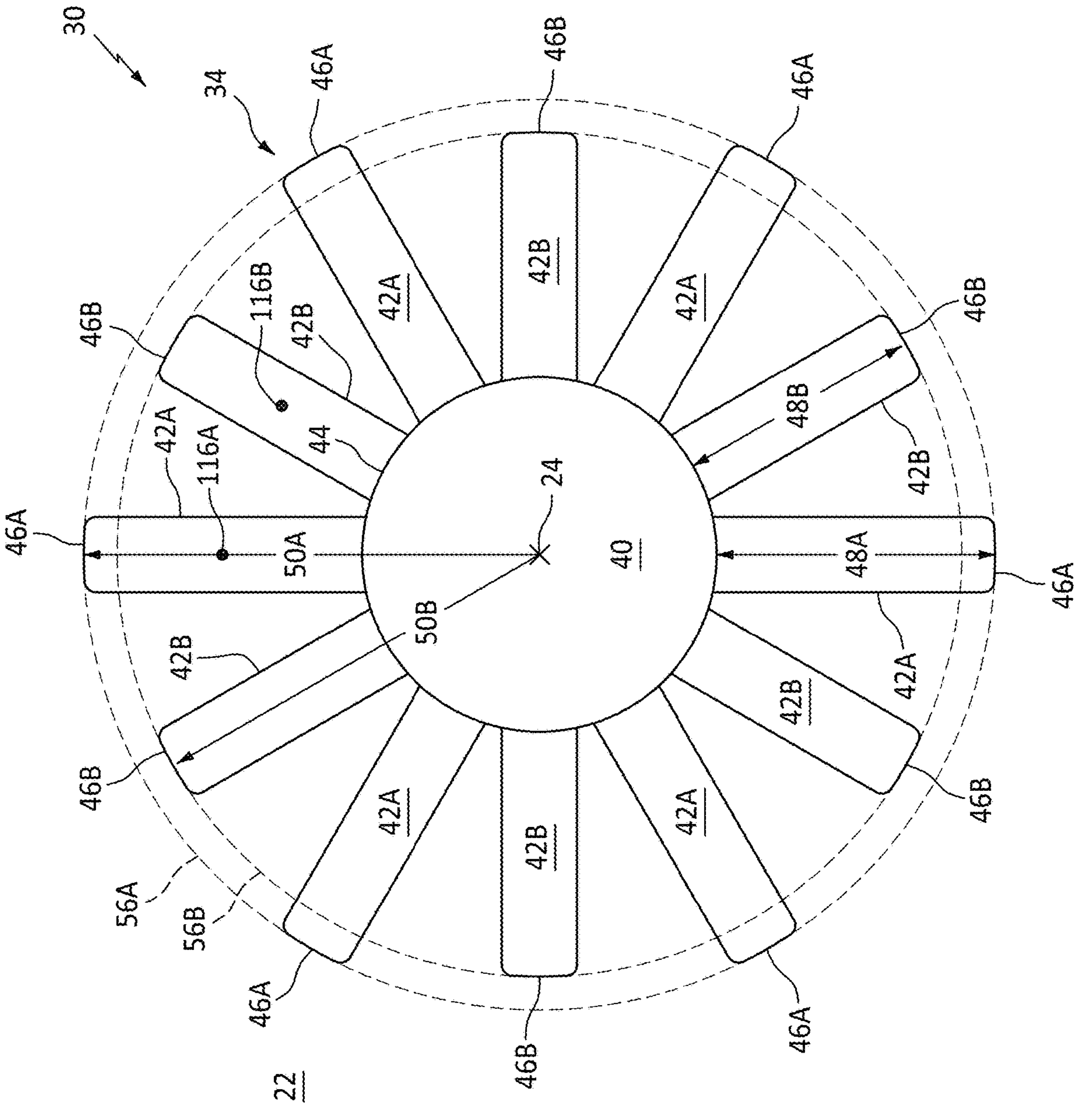
FIG. 2 is a schematic end view illustration of an open propulsor rotor.

Referring to FIG. 2, the propulsor rotor 34 includes a rotor base 40 (e.g., a disk or a hub) and a plurality of open propulsor blades 42A and 42B (generally referred to as "42") (e.g., airfoils), where a quantity of the first propulsor blades 42A is equal to a quantity of the second propulsor blades 42B. The propulsor blades 42 are arranged and may be equispaced circumferentially about the rotor base 40 and the propulsion system axis 24 in an array; e.g., a circular array. Within this array, the first propulsor blades 42A (e.g., first span propulsor blades) are interposed with the second propulsor blades 42B (e.g., second span propulsor blades) about the propulsion system axis 24. More particularly, each first propulsor blade 42A of FIG. 2 is located circumferentially between and circumferentially neighbors (e.g., is adjacent) a respective pair of the second propulsor blades 42B. Similarly, each second propulsor blade 42B of FIG. 2 is located circumferentially between and circumferentially neighbors (e.g., is adjacent) a respective pair of the first propulsor blades 42A. Each of these propulsor blades 42 is connected to (e.g., formed integral with or otherwise attached to) the rotor base 40. Each of the propulsor blades 42 projects spanwise along a span line of the respective propulsor blade 42 (e.g., radially relative to the propulsion system axis 24) out from an exterior surface 44 of the rotor base 40, into the external environment 22, to an unshrouded distal tip 46A, 46B (generally referred to as "46") of the respective propulsor blade 42. Each propulsor blade 42 is thereby configured as an un-ducted and (optionally) unshrouded propulsor blade which is exposed to (e.g., disposed in) the surrounding external environment 22.

Each of the propulsor blades 42 has a blade span length 48A, 48B (generally referred to as "48") and a blade tip radius 50A, 50B (generally referred to as "50"). The blade span length 48 may be measured from the exterior surface 44 of the rotor base 40 to the tip 46 of the respective propulsor blade 42. The blade tip radius 50 may be measured from the propulsion system axis 24 to the tip 46 of the respective propulsor blade 42. The blade span length 48 and/or the blade tip radius 50 of each propulsor blade 42 may be measured in a first lateral reference plane that is, for example, perpendicular to the propulsion system axis 24. This first lateral reference plane may be a leading edge plane defined by an upstream face 52 (see FIG. 1) of the propulsor rotor 34 and its propulsor blades 42. Alternatively, the first lateral reference plane may be a trailing edge plane defined by a downstream face 54 of the propulsor rotor 34 and its propulsor blades 42. Still alternatively, the first lateral reference plane may be an intermediate plane (e.g., a mid-plane) between the upstream face 52 and the downstream face 54. Referring still to FIG. 2, the first propulsor blades 42A may share the common (the same) first blade span length 48A. The second propulsor blades 42B may share the common second blade span length 48B. The second blade span length 48B of FIG. 2, however, is sized smaller than the first blade span length 48A. Similarly, the first propulsor blades 42A may share the common first blade tip radius 50A. The second propulsor blades 42B may share the common second blade tip radius 50B. The second blade tip radius 50B of FIG. 2, however, is sized smaller than the first blade tip radius 50A. With this arrangement, each set of propulsor blades 42A, 42B and their associated tips 46A, 46B form a reference circle 56A, 56B (generally referred to as "56") around the propulsion system axis 24 in the first lateral reference plane, where the first reference circle 56A is radially outboard of and circumscribes the second reference circle 56B.

Referring to FIG. 1, the guide vane structure 36 includes a plurality of open exit guide vanes 58 (e.g., airfoils) that are arranged and may be equispaced circumferentially about the propulsion system axis 24 in an array; e.g., a circular array. This guide vane structure 36 and its guide vanes 58 are arranged axially next to (e.g., adjacent) the propulsor rotor 34 and its propulsor blades 42. The guide vane structure 36 and its guide vanes 58 of FIG. 1, for example, are arranged downstream of the propulsor rotor 34 and its propulsor blades 42, without (e.g., any) other elements axially therebetween to obstruct, turn and/or otherwise influence the air propelled by the propulsor rotor 34 to the guide vane structure 36 for example. Each of the guide vanes 58 of FIG. 1 is coupled to a support structure 60 of a stationary housing structure 62 for the aircraft propulsion system 20. This support structure 60 may be configured as or otherwise include a support frame, a case and/or another fixed structure of the housing structure 62. Each of the guide vanes 58 projects spanwise along a span line of the respective guide vane 58 (e.g., radially relative to the propulsion system axis 24) out from an exterior surface 64 of the housing structure 62, into the external environment 22, to an unshrouded, distal tip 65 of the respective guide vane 58. Here, the exterior surface 64 radially borders the external environment 22 and forms an exterior aerodynamic flow surface of the aircraft propulsion system 20. Each guide vane 58 is thereby configured as an un-ducted and (optionally) unshrouded guide vane which is exposed to (e.g., disposed in) the surrounding external environment 22.

The turbine engine 32 includes an inlet section 66, a compressor section 67, a combustor section 68, a turbine section 69 and an exhaust section 70. The compressor section 67 of FIG. 1 includes a low pressure compressor (LPC) section 67A and a high pressure compressor (HPC) section 67B. The turbine section 69 of FIG. 1 includes a high pressure turbine (HPT) section 69A and a low pressure turbine (LPT) section 69B. The turbine engine 32 also includes an (e.g., annular) engine flowpath 72 which extends longitudinally through the aircraft propulsion system 20 of FIG. 1 and its turbine engine 32 from an (e.g., annular) airflow inlet 74 into the engine flowpath 72 to a (e.g., annular) combustion products exhaust 76 from the engine flowpath 72. The flowpath inlet 74 is also an airflow inlet into the aircraft propulsion system 20 of FIG. 1 and its turbine engine 32. The flowpath exhaust 76 is also a combustion products exhaust from the aircraft propulsion system 20 of FIG. 1 and its turbine engine 32. At least (or only) the LPC section 67A, the HPC section 67B, the combustor section 68, the HPT section 69A and the LPT section 69B collectively form a core 78 (e.g., a gas generator) of the turbine engine 32.

Each of the engine sections 67A, 67B, 69A and 69B includes a respective bladed rotor 80-83; e.g., a ducted and/or shrouded engine rotor. Each of these engine rotors 80-83 includes a rotor base (e.g., a disk or a hub) and a plurality of rotor blades (e.g., airfoils, vanes, etc.). The rotor blades are arranged and may be equispaced circumferentially around the respective rotor base in an array. The rotor blades may also be arranged into one or more stages longitudinally along the engine flowpath 72. Each of the rotor blades is connected to the respective rotor base. Each of the rotor blades projects radially (e.g., spanwise) out from the respective rotor base into the engine flowpath 72 and to a distal tip of the respective rotor blade.

The HPC rotor 81 is coupled to and rotatable with the HPT rotor 82. The HPC rotor 81 of FIG. 1, for example, is connected to the HPT rotor 82 by a high speed shaft 86. At least (or only) the HPC rotor 81, the HPT rotor 82 and the high speed shaft 86 collectively form a high speed rotating structure 88; e.g., a high speed spool of the engine core 78. This high speed rotating structure 88 of FIG. 1 and its members 81, 82 and 86 are rotatable about the propulsion system axis 24. However, in other embodiments, the high speed rotating structure 88 and its members 81, 82 and 86 may alternatively be rotatable about another rotational axis which is (e.g., laterally and/or angularly) offset from the rotational axis of the propulsor rotor 34.

The LPC rotor 80 is coupled to and rotatable with the LPT rotor 83. The LPC rotor 80 of FIG. 1, for example, is connected to the LPT rotor 83 by a low speed shaft 90. At least (or only) the LPC rotor 80, the LPT rotor 83 and the low speed shaft 90 collectively form a low speed rotating structure 92; e.g., a low speed spool of the engine core 78. This low speed rotating structure 92 of FIG. 1 and its members 80, 83 and 90 are rotatable about the propulsion system axis 24. However, in other embodiments, the low speed rotating structure 92 and its members 80, 83 and 90 may alternatively be rotatable about another rotational axis which is (e.g., laterally and/or angularly) offset from the rotational axis of the propulsor rotor 34.

The low speed rotating structure 92 is coupled to the propulsor rotor 34 through a drivetrain 94. This drivetrain 94 may be configured as a geared drivetrain, where a geartrain 96 (e.g., a transmission, a speed change device, an epicyclic geartrain, etc.) is disposed between and operatively couples the propulsor rotor 34 to the low speed rotating structure 92 and its LPT rotor 83. With this arrangement, the propulsor rotor 34 may rotate at a different (e.g., slower) rotational speed than the low speed rotating structure 92 and its LPT rotor 83. Here, the propulsor rotor 34 and the low speed rotating structure 92 may rotate in a common (the same) direction about the propulsion system axis 24 or in opposite directions about the propulsion system axis 24 depending, for example, upon the specific configuration of the geartrain 96. Alternatively, the drivetrain 94 may be configured as a direct-drive drivetrain, where the geartrain 96 is omitted. With such an arrangement, the propulsor rotor 34 rotates at a common (the same) rotational speed as the low speed rotating structure 92 and its LPT rotor 83.

The engine sections 66-70 may be arranged sequentially along the propulsion system axis 24 and are housed within and/or formed by the housing structure 62. This housing structure 62 includes an engine case 98 (e.g., a gas generator case) and a nacelle 100. The engine case 98 houses one or more of the engine sections 67A-69B; e.g., the engine core 78. The engine case 98 of FIG. 1, for example, extends axially along (e.g., axially overlaps) and extends circumferentially about (e.g., circumscribes) the engine sections 67A-69B and their respective bladed rotors 80-83. The engine case 98 may also house the geartrain 96. The nacelle 100 houses and provides an aerodynamic cover over the engine case 98. An exterior wall of the nacelle 100 of FIG. 1, for example, is disposed radially outboard of, extends axially along (e.g., axially overlaps) and extends circumferentially about (e.g., circumscribes) the engine core 78 and its engine case 98. This nacelle wall may at least partially or completely form the exterior surface 64. With the foregoing arrangement, the bladed rotors 80-83 are disposed within the housing structure 62. By contrast, the propulsor rotor 34 and the guide vane structure 36 are disposed at least partially (or completely) outside of the housing structure 62.

During operation of the aircraft propulsion system 20 of FIG. 1, ambient air within the external environment 22 is propelled by the rotating propulsor rotor 34 in the downstream, aft direction towards the propulsion system aft end 28. A major portion (e.g., more than 50%) of this air bypasses the turbine engine 32 to provide forward thrust while a minor portion (e.g., less than 50%) of the air flows into the turbine engine 32. For example, an outer stream of the air propelled by the rotating propulsor rotor 34 flows axially across the guide vane structure 36 and outside of the housing structure 62 and its exterior surface 64; e.g., along an exterior of the nacelle 100. The guide vane structure 36 conditions (e.g., straightens out, de-swirls, etc.) the outer stream of air within the external environment 22 to enhance the forward thrust. By contrast, an inner stream of the air propelled by the rotating propulsor rotor 34 may bypass the guide vane structure 36 and enter the turbine engine 32 and its engine flowpath 72 through the flowpath inlet 74. The air entering the engine flowpath 72 through the flowpath inlet 74 may be referred to as "core air".

The core air is compressed by the LPC rotor 80 and the HPC rotor 81 and directed into a combustion chamber 102 (e.g., an annular combustion chamber) of a combustor 104 (e.g., an annular combustor) in the combustor section 68. Fuel is injected into the combustion chamber 102 by one or more fuel injectors and mixed with the compressed core air to provide a fuel-air mixture. This fuel-air mixture is ignited and combustion products thereof flow through and sequentially drive rotation of the HPT rotor 82 and the LPT rotor 83. The rotation of the HPT rotor 82 and the LPT rotor 83 respectively drive rotation of the HPC rotor 81 and the LPC rotor 80 and, thus, compression of the core air. The rotation of the LPT rotor 83 also drives the rotation of the propulsor rotor 34 through the geartrain 96. The turbine engine 32 and its low speed rotating structure 92 thereby power operation of (e.g., drive rotation of) the propulsor rotor 34 during aircraft propulsion system operation.

Figure 3:
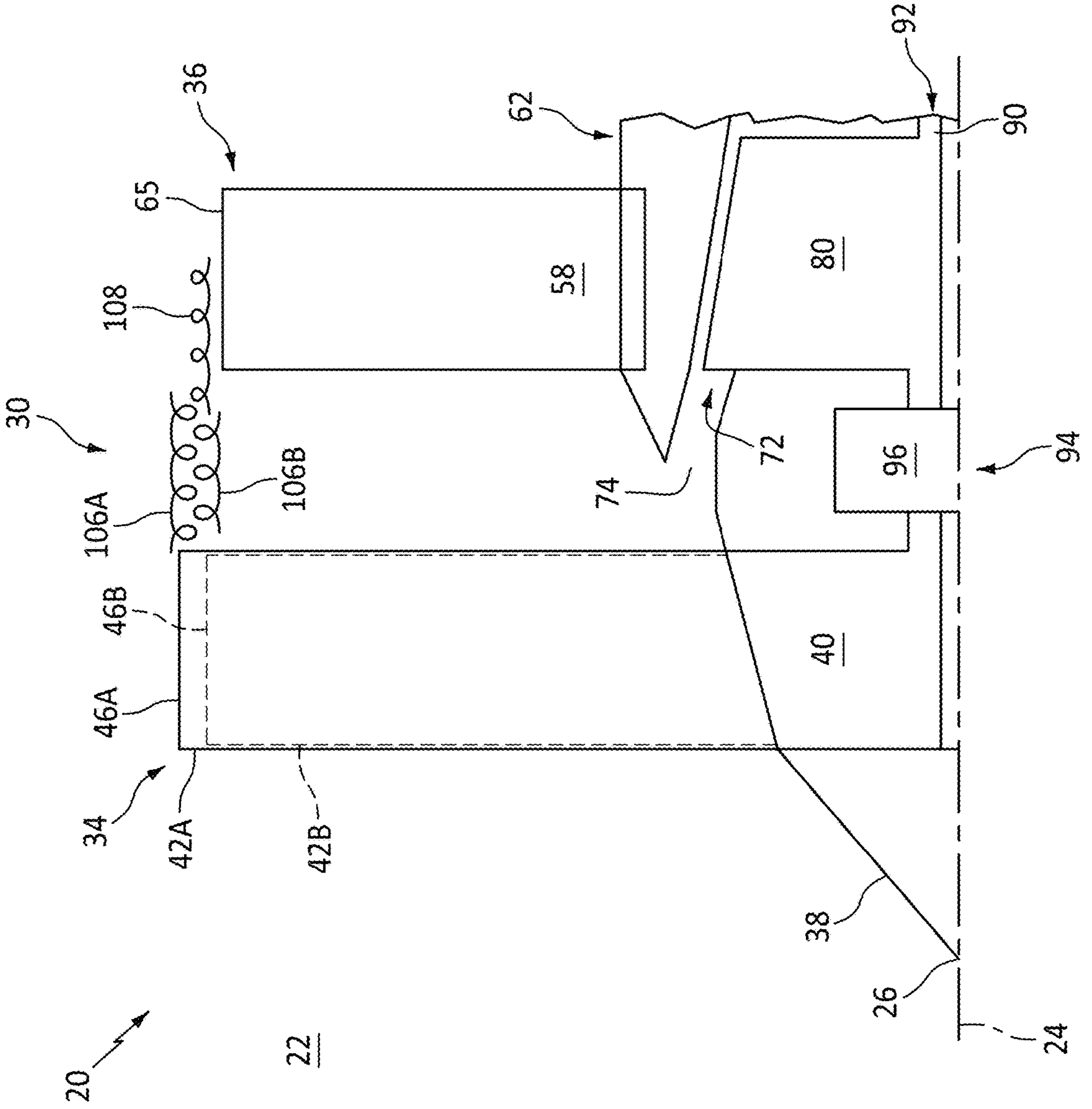
FIG. 3 is a schematic sectional illustration of a portion of the aircraft propulsion system at a propulsion section during propulsion system operation.

Referring to FIG. 3, as the propulsor rotor 34 rotates about the propulsion system axis 24, each propulsor blade 42 may generate a tip vortex 106A, 106B (generally referred to as "106") along an outer periphery of the outer stream of air propelled by the propulsor rotor 34. If left unmitigated, such tip vortices 106 may produce sound waves (e.g., noise) upon impacting a downstream structure. Examples of the downstream structure may include the guide vane structure 36 (see FIG. 1), a pylon structure for the aircraft propulsion system 20, an aircraft wing, an aircraft fuselage, etc. However, the first blade tip vortices 106A generated by the first propulsor blades 42A of FIG. 3 are radially offset outwards from the second blade tip vortices 106B generated by the second propulsor blades 42B. With this offset, the tip vortices 106 may be generated such that a radial inner peripheral boundary region of the first blade tip vortices 106A destructively interact with a radial outer peripheral boundary region of the second blade tip vortices 106B. This destructive interaction between the tip vortices 106 may substantially reduce a magnitude of the resultant tip vortices 108. The resultant tip vortices 108 therefore may produce fewer sound waves upon impacting the downstream structure; e.g., closer to free-stream air impinging against the downstream structure.

Figure 4A:
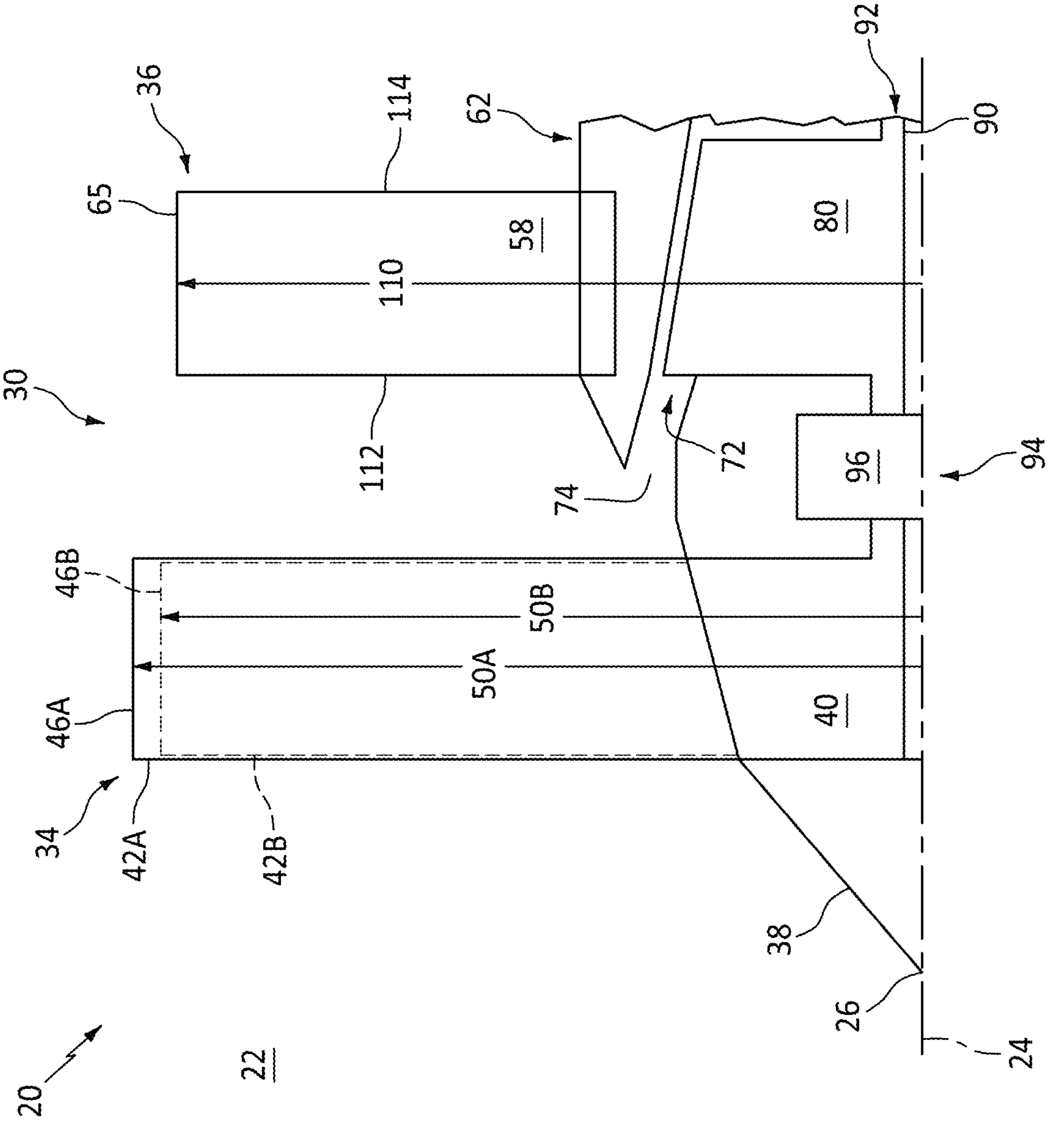
FIGS. 4A-C are schematic sectional illustrations of portions of the aircraft propulsion system at the propulsion section with various open guide vane structure arrangements.
Figure 4B:
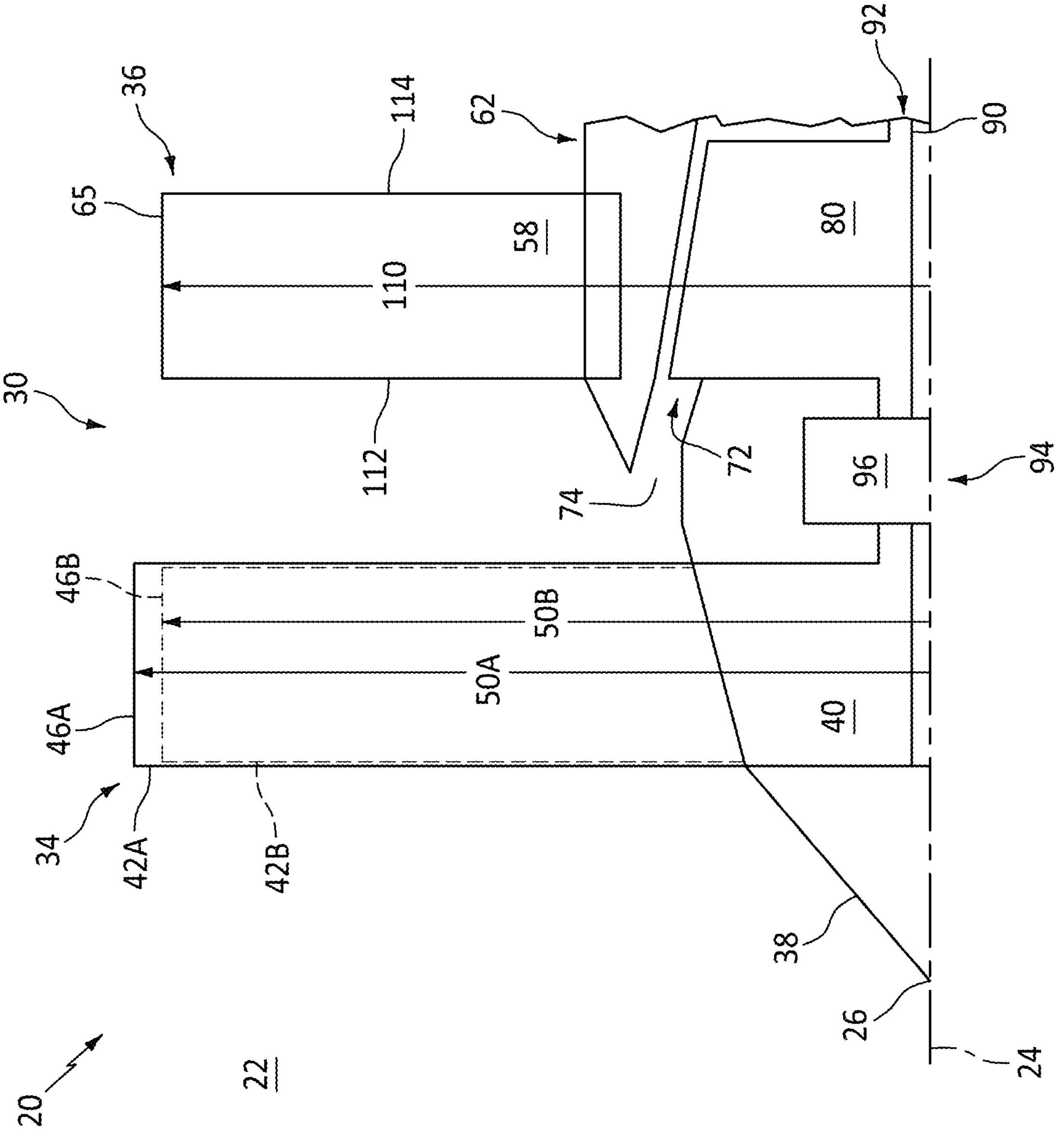
Figure 4C:
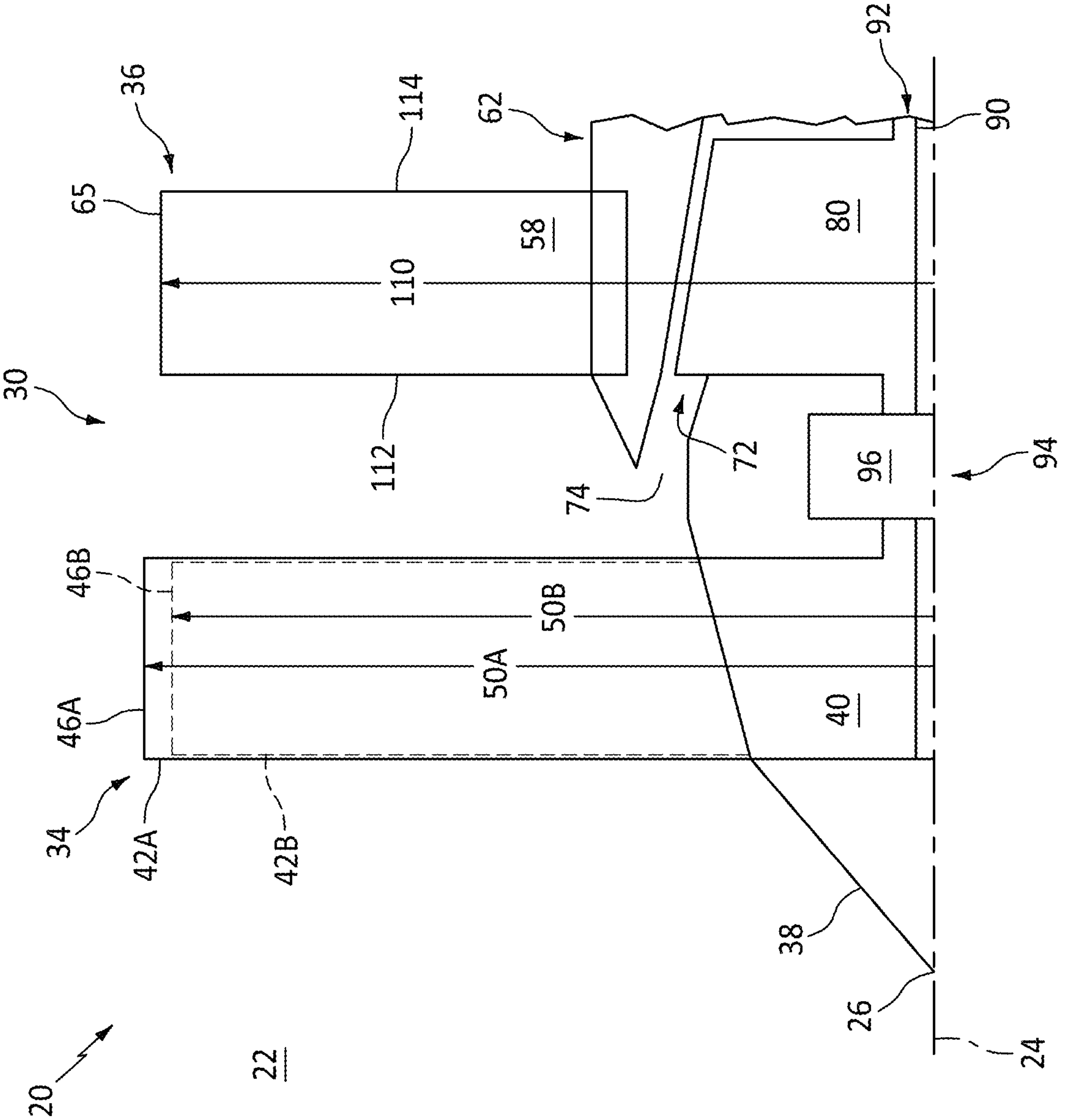

Referring to FIGS. 4A-C, each of the guide vanes 58 has a vane tip radius 110. This vane tip radius 110 may be measured from the propulsion system axis 24 to the tip 65 of the respective guide vane 58. The vane tip radius 110 of each guide vane 58 may be measured in a second lateral reference plane that is, for example, perpendicular to the propulsion system axis 24. This second lateral reference plane may be a leading edge plane defined by an upstream face 112 of the guide vane structure 36 and its guide vanes 58. Alternatively, the second lateral reference plane may be a trailing edge plane defined by a downstream face 114 of the guide vane structure 36 and its guide vanes 58. Still alternatively, the second lateral reference plane may be an intermediate plane (e.g., a mid-plane) between the upstream face 112 and the downstream face 114. In some embodiments, referring to FIG. 4A, the vane tip radius 110 may be sized smaller than the second blade tip radius 50B. By arranging the vane tips 65 radially inboard, the guide vanes 58 and their tips 65 may be disposed substantially or completely radially inboard of the resultant tip vortices 108 (see FIG. 3). In other embodiments, referring to FIG. 4B, the vane tip radius 110 may be equal to the second blade tip radius 50B. In still other embodiments, referring to FIG. 4C, the vane tip radius 110 may be sized larger than the second blade tip radius 50B. However, the vane tip radius 110 may still be sized smaller than (or equal to) the first blade tip radius 50A. Here, by extending the guide vanes 58 further radially outboard, the guide vane structure 36 may condition more (or all) of the outer stream of the air propelled by the propulsor rotor 34 and, thus, increase aircraft propulsion system efficiency.

In some embodiments, referring to FIG. 2, the second blade span length 48B may be sized between eighty-five percent (85%) and ninety-eight percent (98%) of the first blade span length 48A, inclusive. In addition or alternatively, the second blade tip radius 50B may be sized between eighty-five percent (85%) and ninety-eight percent (98%) of the first blade tip radius 50A, inclusive. The present disclosure, however, is not limited to such an exemplary proportional relationships. The relative span lengths 48 and/or tip radiuses 50, for example, may be altered based on various parameters such as, but not limited to, an operating speed range for the propulsor rotor 34, axial spacing between the propulsor rotor 34 and the guide vane structure 36, etc. Although described at different lengths 48A, 48B, in some embodiments each of the propulsor blades 42A, 42B may include substantially the same mass (e.g., 42A and 42B of the same mass, 42A within 5% mass of 42B, etc.).

In some embodiments, the propulsor blades 42 may be configured such that a center of gravity 116A of each first propulsor blade 42A and a center of gravity 116B of each second propulsor blade 42B may be located at a common radial distance from the propulsion system axis 24. Such an arrangement may facilitate balancing of the propulsor rotor 34. In other embodiments, however, it is contemplated the center of gravity 116A of each first propulsor blade 42A and the center of gravity 116B of each second propulsor blade 42B may be located at different radial distances from the propulsion system axis 24.

Figure 5A:
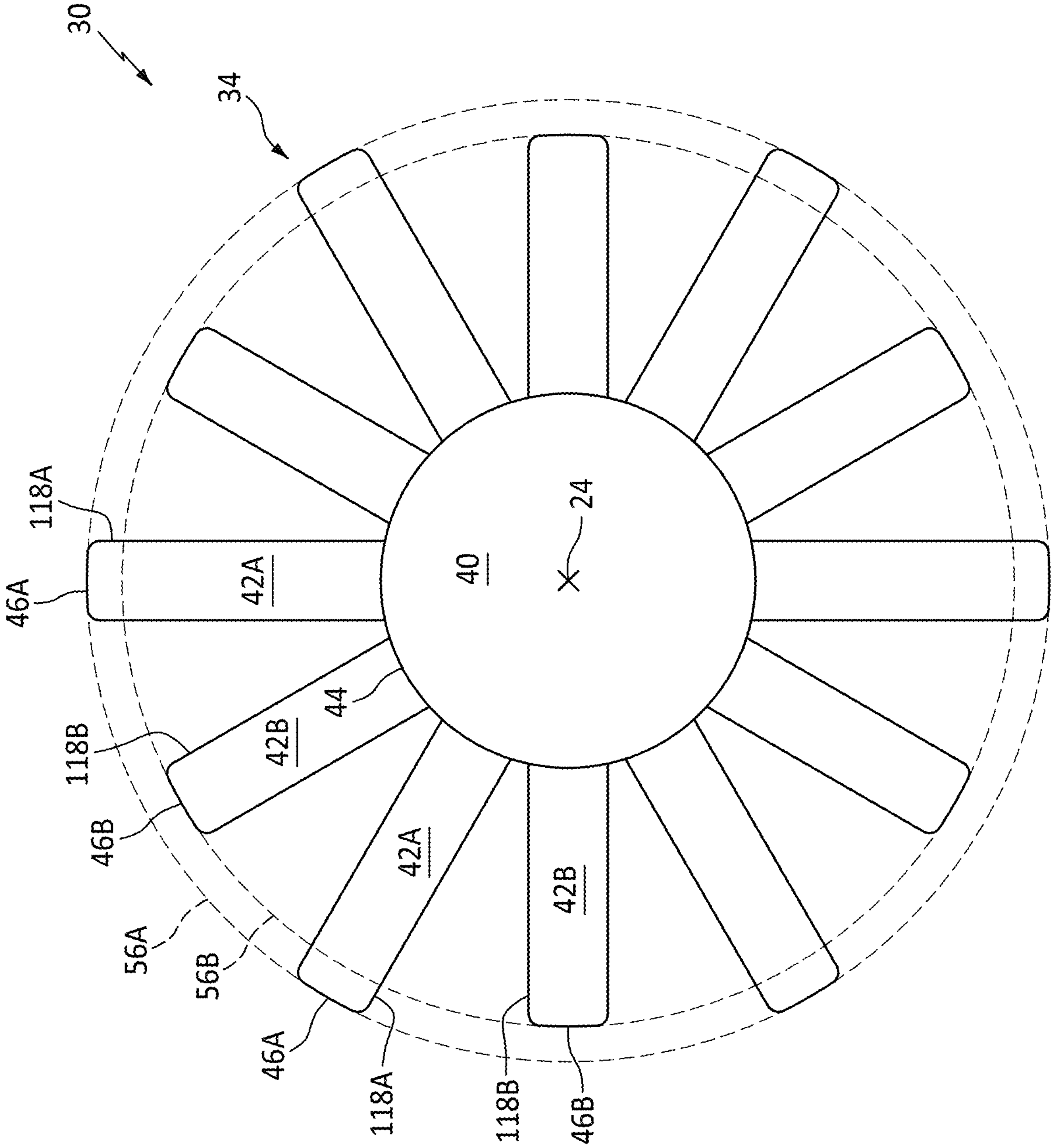
FIGS. 5A and 5B are schematic end view illustrations of the open propulsor rotor with various tip section arrangements.
Figure 5B:
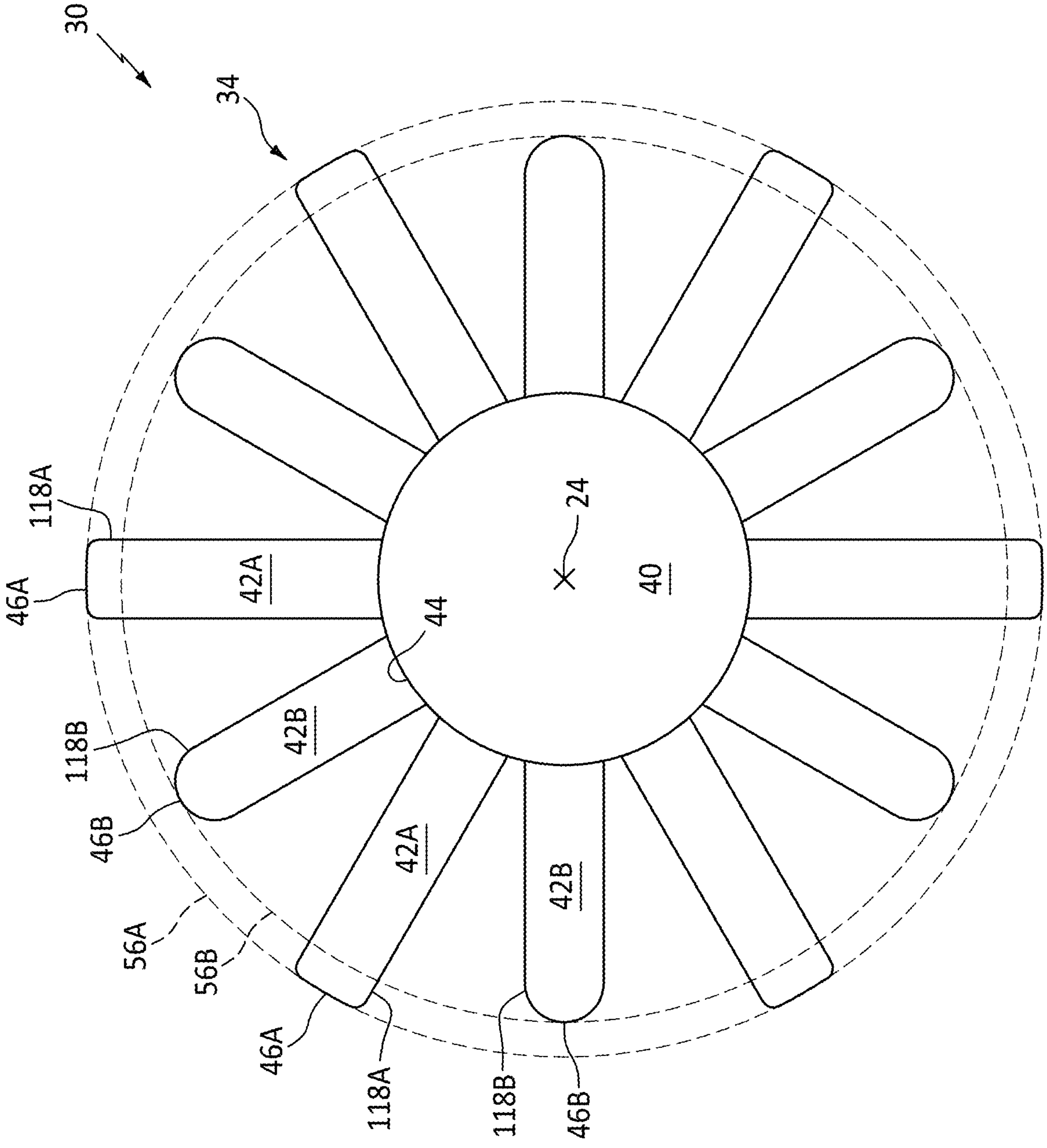
Figure 6A:
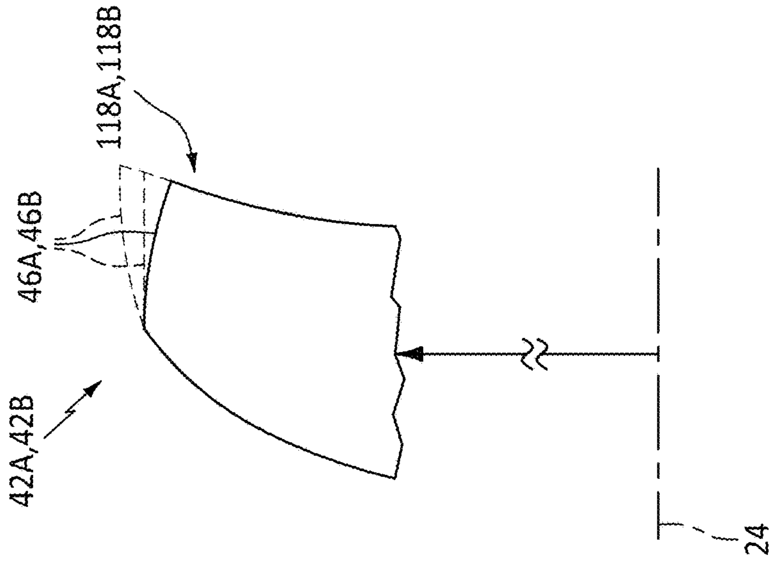
FIGS. 6A-C are partial side view illustrations of portions of an open propulsor blade with various tip section arrangements.
Figure 6B:
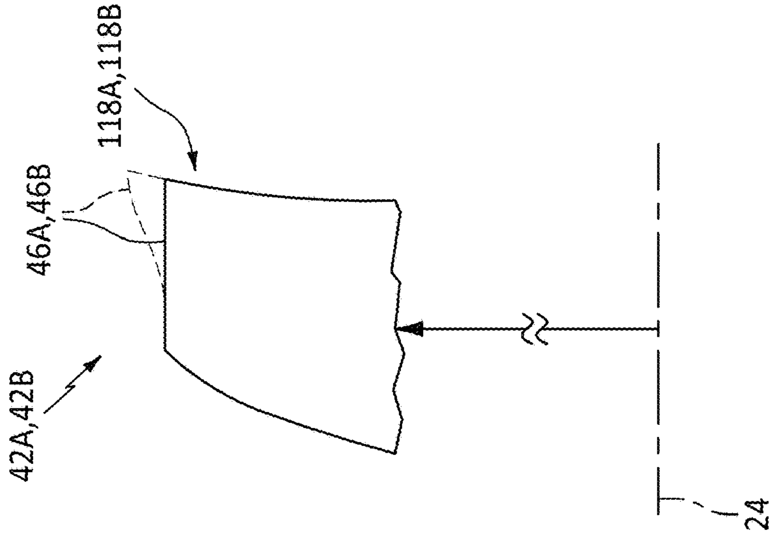
Figure 6C:
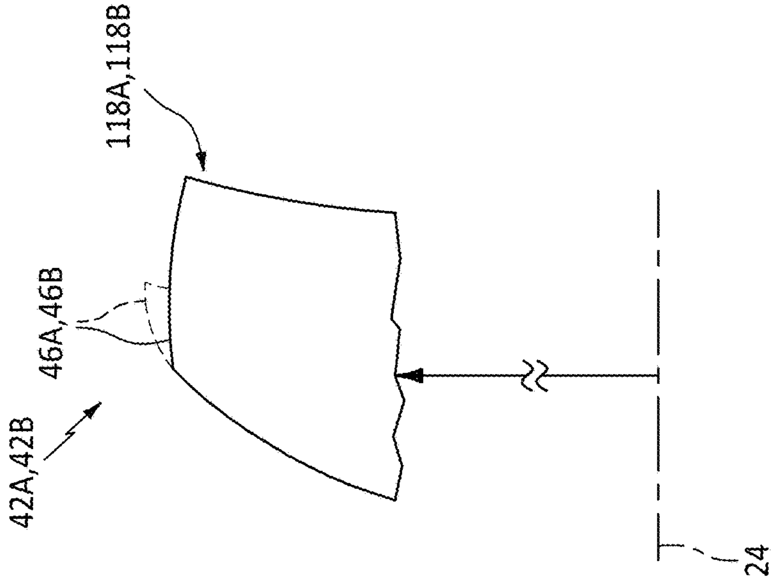
Figure 7B:
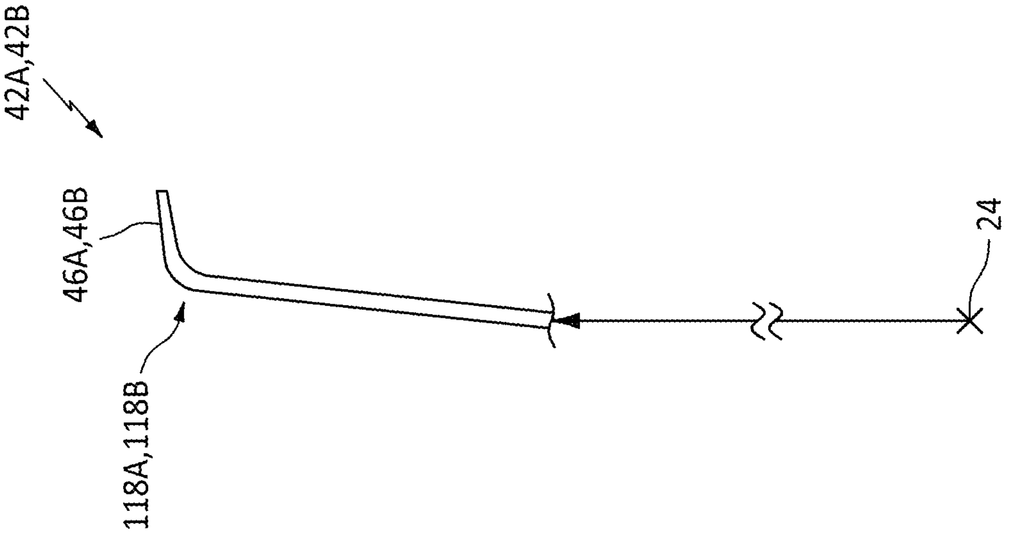
FIGS. 7A and 7B are partial end view illustrations of portions of the open propulsor blade with various tip section arrangements.
Figure 7A:
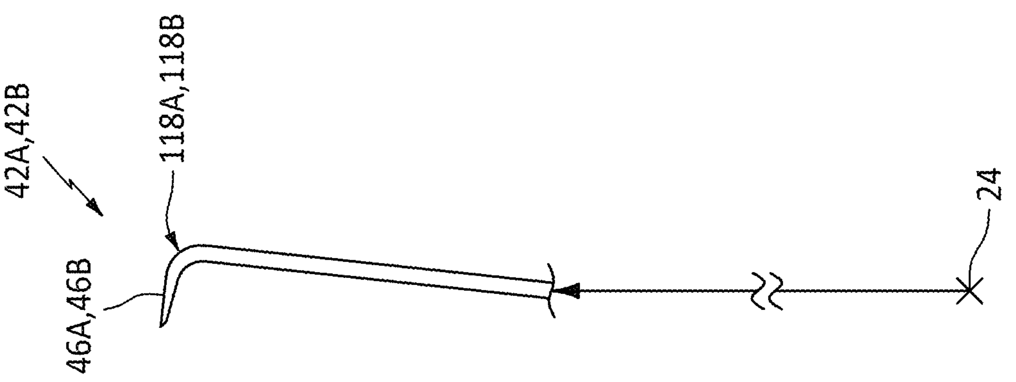
Figure 8B:
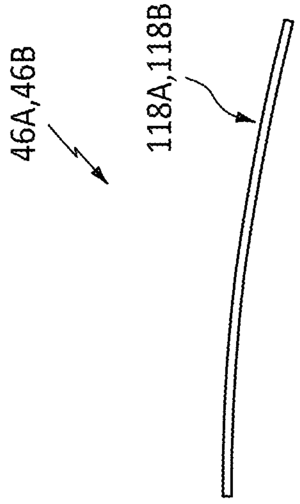
FIGS. 8A and 8B are partial sectional illustrations of portions of the open propulsor blade with various tip section arrangements.
Figure 8A:
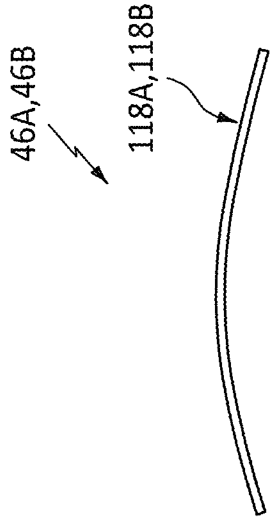

In some embodiments, referring to FIG. 5A, a configuration of a tip section 118A of each first propulsor blade 42A may be similar to or identical to a configuration of a tip section 118B of each second propulsor blade 42B. In other embodiments, referring to FIG. 5B, the configuration of the tip section 118A of each first propulsor blade 42A may be different than the configuration of the tip section 118B of each second propulsor blade 42B (schematically shown in FIG. 5B). For example, the first propulsor blade tip sections 118A and the second propulsor blade tip sections 118B may be uniquely configured to further tune destructive tip vortex interaction between the first and the second tip vortices 106 (see FIG. 3). In some embodiments, the first and the second propulsor blades 42A and 42B may be configured to provide their tip sections 118A and 118B (generally referred to as "118") with different geometries (e.g., shapes, contours, dimensions, etc.) when viewed, for example, in a longitudinal reference plane parallel to (e.g., including) the propulsion system axis 24. Examples of various features which may be uniquely tuned in the longitudinal reference plane are shown in FIGS. 6A-C. In some embodiments, the first and the second propulsor blades 42A and 42B may also or alternatively be configured to provide their tip sections 118 with different geometries (e.g., shapes, contours, dimensions, etc.) when viewed, for example, in a lateral reference plane; e.g., the first lateral reference plane. Examples of various features which may be uniquely tuned in the lateral reference plane are shown in FIGS. 7A and 7B. In some embodiments, the first and the second propulsor blades 42A and 42B may still also or alternatively be configured to provide their tip sections 118 with different cross-sectional geometries (e.g., shapes, contours, dimensions, etc.); e.g., different cambers and/or pitches. Examples of various cambers and/or pitches are shown in FIGS. 8A and 8B. Moreover, while the tip sections 118A and 118B of the first and the second propulsor blades 42A and 42B may be uniquely configured in conjunction with providing the different tip radiuses described above, it is also contemplated the tip sections 118A and 118B of the first and the second propulsor blades 42A and 42B may be uniquely configured in conjunction with a set of uniform tip radiuses.

Referring to FIG. 1, the engine flowpath 72 extends longitudinally from the flowpath inlet 74, sequentially through the inlet section 66, the LPC section 67A, the HPC section 67B, the combustor section 68, the HPT section 69A, the LPT section 69B and the exhaust section 70, to the flowpath exhaust 76. The engine flowpath 72 of FIG. 1 is configured such that the core air and the combustion products generally flow in the aft, downstream direction towards the propulsion system aft end 28. The core air and the combustion products thereby flow along with the ambient air propelled by the rotating propulsor rotor 34 in a common axial direction—the downstream, aft direction. The turbine engine 32 of the present disclosure, however, is not limited to such an exemplary common flow engine arrangement. For example, the engine flowpath 72 may alternatively be configured such that the core air and the combustion products generally flow in a forward, upstream direction towards the propulsion system forward end 26. The core air and the combustion products may thereby flow in an opposite direction as the ambient air propelled by the rotating propulsor rotor 34. Here, the turbine engine 32 may have a reverse flow engine arrangement.

Figure 9:
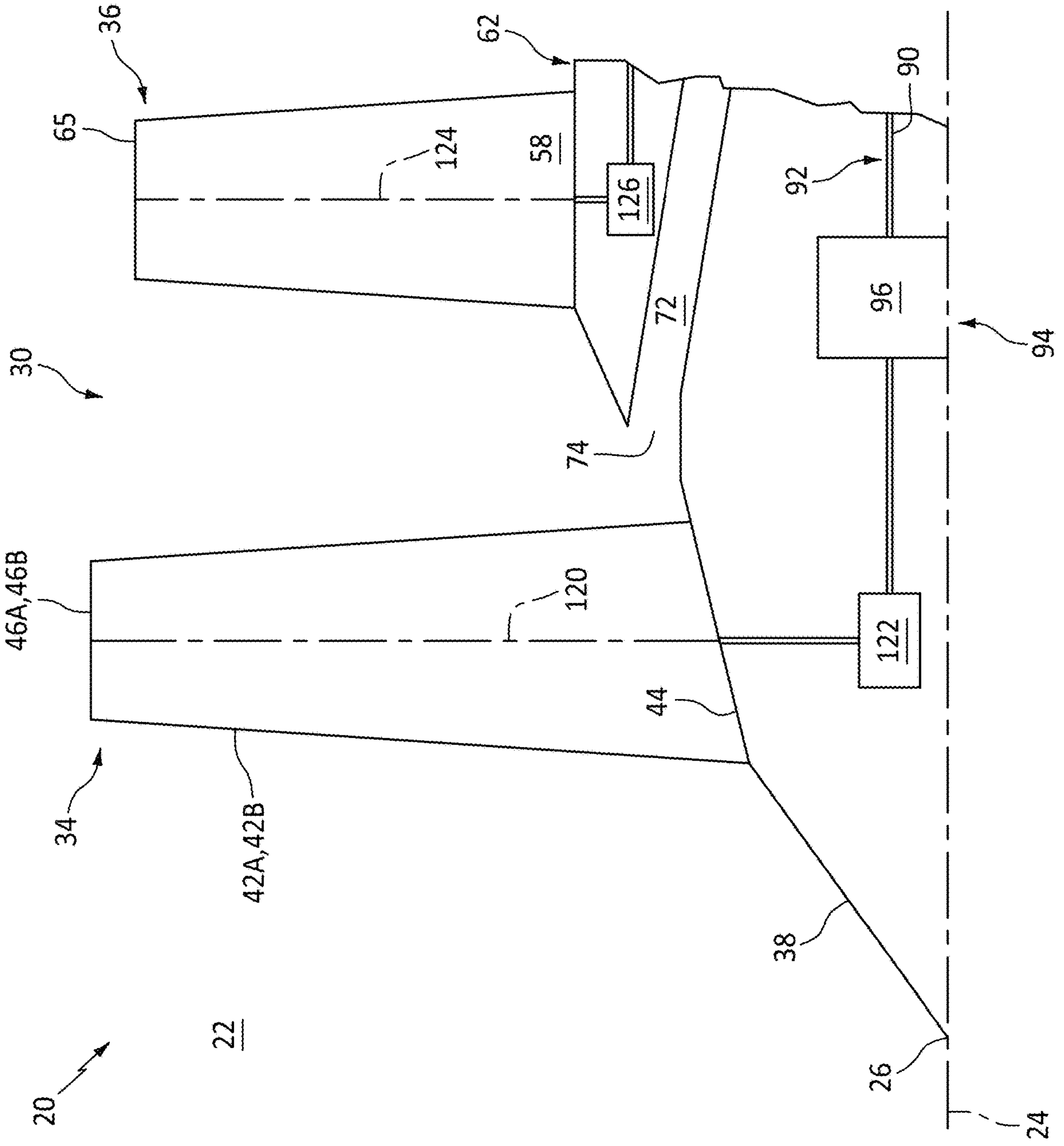
FIG. 9 is a partial schematic sectional illustration of the aircraft propulsion system at the propulsion section.

In some embodiments, referring to FIG. 9, each propulsor blade 42 may be configured to pivot about a respective blade pivot axis 120. This blade pivot axis 120 extends radially relative to the propulsion system axis 24. The blade pivot axis 120 of FIG. 9, for example, is arranged perpendicular to the propulsion system axis 24 when viewed, for example, in the longitudinal reference plane; e.g., the plane of FIG. 9. Each propulsor blade 42 of FIG. 9 is operatively coupled with a blade actuation system 122. This blade actuation system 122 is configured to pivot each propulsor blade 42 about its own respective blade pivot axis 120. By pivoting each propulsor blade 42 about its blade pivot axis 120, a pitch of the respective propulsor blade 42 may be changed. Note, while the blade pivot axis 120 is shown in FIG. 9 as being perpendicular to the propulsion system axis 24, it is contemplated this blade pivot axis 120 may or may not be coincident with the propulsion system axis 24. Moreover, it is contemplated each blade pivot axis 120 may alternatively be angularly offset from the propulsion system axis 24 by an acute angle or an obtuse angle when viewed, for example, in the longitudinal reference plane. Of course, it is contemplated some or all of the propulsor blades 42 may be alternatively moved to change the propulsor blade pitch. Moreover, it is contemplated some or all of the propulsor blades 42 may alternatively be fixed pitch propulsor blades in other embodiments.

In some embodiments, each guide vane 58 may be configured to pivot about a respective vane pivot axis 124. This vane pivot axis 124 extends radially relative to the propulsion system axis 24. The vane pivot axis 124 of FIG. 9, for example, is arranged perpendicular to the propulsion system axis 24 when viewed, for example, in the longitudinal reference plane. Each guide vane 58 of FIG. 9 is operatively coupled with a vane actuation system 126, which vane actuation system 126 may be discrete from or integrated as part of the blade actuation system 122. The vane actuation system 126 is configured to pivot each guide vane 58 about its own respective vane pivot axis 124. By pivoting each guide vane 58 about its vane pivot axis 124, a pitch of the respective guide vane 58 may be changed. Note, while the vane pivot axis 124 is shown in FIG. 9 as being perpendicular to the propulsion system axis 24, it is contemplated this vane pivot axis 124 may or may not be coincident with the propulsion system axis 24. Moreover, it is contemplated each vane pivot axis 124 may alternatively be angularly offset from the propulsion system axis 24 by an acute angle or an obtuse angle when viewed, for example, in the longitudinal reference plane. Of course, it is contemplated some or all of the guide vanes 58 may be alternatively moved to change the guide vane pitch. Moreover, it is contemplated some or all of the guide vanes 58 may alternatively be fixed pitch guide vanes in other embodiments.

The propulsion section 30 of FIG. 1 is described above with a tractor configuration; e.g., where the propulsor rotor 34 is disposed at or otherwise near the propulsion system forward end 26. It is contemplated, however, the propulsion section 30 may alternatively be disposed at or otherwise near the propulsion system aft end 28 to provide a pusher fan configuration. Moreover, while the turbine engine 32 is described above with a particular two rotating structure arrangement, the present disclosure is not limited thereto. For example, the LPC rotor 80 may be omitted to configure the LPT rotor 83 as a power turbine (PT) rotor for the propulsor rotor 34. In another example, the turbine engine 32 may also include another rotating structure; e.g., an intermediate speed spool for the engine core 78.

The guide vane structure 36 is described above as a fixed (e.g., non-rotatable) guide vane structure. It is contemplated, however, the guide vane structure 36 may alternatively be selectively rotatable about the propulsion system axis 24. With such an arrangement, the aircraft propulsion system 20 may be configured as an open rotor propulsion system with a swirl recovery blade (SRB) open rotor architecture. More particularly, the aircraft propulsion system 20 may operate as: (A) a counter-rotating open rotor (CROR) propulsion system during a dual rotor mode of operation (e.g., when both the propulsor rotor 34 and the structure 36 are counter-rotating about the propulsion system axis 24); and (B) a single open rotor and swirl recovery vane (SRV) propulsion system during a single rotor mode of operation (e.g., when the propulsor rotor 34 is rotating and the structure 36 is rotationally fixed about the propulsion system axis 24). Note, when the guide vane structure 36 is configured to selectively rotate about the propulsion system axis 24, the moving guide vanes 58 operate as propulsor blades.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:

an open propulsor rotor configured to rotate about an axis, the open propulsor rotor comprising a plurality of open propulsor blades arranged circumferentially about the axis in a blade array, each of the plurality of open propulsor blades projecting spanwise into an environment external to the aircraft propulsion system to a respective blade tip, the plurality of open propulsor blades comprising a first span propulsor blade and a second span propulsor blade, the first span propulsor blade having a first span length, and the second span propulsor blade having a second span length that is less than the first span length, wherein a first center of gravity of the first span propulsor blade and a second center of gravity of the second span propulsor blade are located at a common radial distance from the axis; and an open guide vane structure axially next to the open propulsor rotor.

2. The assembly of claim 1, wherein the second span length is equal to or greater than eighty-five percent of the first span length.

3. The assembly of claim 1, wherein the second span length is equal to or less than ninety-eight percent of the first span length.

4. The assembly of claim 1, wherein the second span propulsor blade circumferentially neighbors the first span propulsor blade in the blade array about the axis.

5. The assembly of claim 1, wherein a first configuration of a tip section of the first span propulsor blade is different than a second configuration of a tip section of the second span propulsor blade.

6. The assembly of claim 1, wherein a first geometry of a tip section of the first span propulsor blade is different than a second geometry of a tip section of the second span propulsor blade when viewed in a reference plane parallel with the axis.

7. The assembly of claim 1, wherein a first geometry of a tip section of the first span propulsor blade is different than a second geometry of a tip section of the second span propulsor blade when viewed in a reference plane perpendicular to the axis.

8. The assembly of claim 1, wherein a first camber of a tip section of the first span propulsor blade is different than a second camber of a tip section of the second span propulsor blade when viewed in a reference plane perpendicular to the axis.

9. The assembly of claim 1, wherein a first pitch of a tip section of the first span propulsor blade is different than a second pitch of a tip section of the second span propulsor blade when viewed in a reference plane perpendicular to the axis.

10. The assembly of claim 1, wherein the first span propulsor blade is one of a plurality of first span propulsor blades included in the plurality of open propulsor blades;

the second span propulsor blade is one of a plurality of second span propulsor blades included in the plurality of open propulsor blades; and the plurality of second span propulsor blades are circumferentially interposed with the plurality of first span propulsor blades.

11. The assembly of claim 1, wherein the open guide vane structure comprises a plurality of open guide vanes arranged circumferentially about the axis in a vane array;

each of the plurality of open guide vanes projects spanwise into the environment external to the aircraft propulsion system to a respective vane tip; and a tip radius of a first of the plurality of open guide vanes is less than a tip radius of the second span propulsor blade.

12. The assembly of claim 1, wherein the open guide vane structure comprises a plurality of open guide vanes arranged circumferentially about the axis in a vane array;

each of the plurality of open guide vanes projects spanwise into the environment external to the aircraft propulsion system to a respective vane tip; and a tip radius of a first of the plurality of open guide vanes is equal to a tip radius of the second span propulsor blade.

13. The assembly of claim 1, wherein the open guide vane structure comprises a plurality of open guide vanes arranged circumferentially about the axis in a vane array;

each of the plurality of open guide vanes projects spanwise into the environment external to the aircraft propulsion system to a respective vane tip; and a tip radius of a first of the plurality of open guide vanes is greater than a tip radius of the second span propulsor blade.

14. The assembly of claim 1, wherein the open guide vane structure is disposed downstream of the open propulsor rotor.

15. The assembly of claim 1, further comprising:

a turbine engine configured to drive rotation of the open propulsor rotor about the axis;

the turbine engine including a flowpath, a compressor section, a combustor section and a turbine section, the flowpath extending through the compressor section, the combustor section and the turbine section from an inlet into the flowpath to an exhaust from the flowpath.

16. The assembly of claim 15, wherein the open propulsor rotor is arranged axially forward of the turbine engine.

17. An assembly for an aircraft propulsion system, comprising:

an open propulsor rotor configured to rotate about an axis, the open propulsor rotor comprising a plurality of open propulsor blades arranged circumferentially about the axis in an array, each of the plurality of open propulsor blades projecting spanwise into an environment external to the aircraft propulsion system to a respective blade tip, the plurality of open propulsor blades comprising a first propulsor blade and a second propulsor blade, the first propulsor blade having a first tip radius, and the second propulsor blade having a second tip radius that is less than the first tip radius, wherein a first center of gravity of the first propulsor blade and a second center of gravity of the second propulsor blade are located at a common radial distance from the axis; and an open guide vane structure axially next to the open propulsor rotor.

18. An assembly for an aircraft propulsion system, comprising:

an open propulsor rotor configured to rotate about an axis;

the open propulsor rotor comprising a plurality of open propulsor blades arranged circumferentially about the axis in an array, each of the plurality of open propulsor blades projecting spanwise into an environment external to the aircraft propulsion system to a respective blade tip, and the plurality of open propulsor blades comprising a first propulsor blade and a second propulsor blade, wherein the first propulsor blade has a first tip radius, and the second propulsor blade has a second tip radius that is less than the first tip radius; and a configuration of a tip section of the first propulsor blade different than a configuration of a tip section of the second propulsor blade, wherein the tip section of the second propulsor blade is configured to generate a tip vortex that will destructively interact with a tip vortex generated by the tip section of the first propulsor blade, and a first center of gravity of the first propulsor blade and a second center of gravity of the second propulsor blade are located at a common radial distance from the axis.

* * * * *